United States Patent
Nagata et al.

(10) Patent No.: US 10,712,731 B2
(45) Date of Patent: Jul. 14, 2020

(54) CONTROL DEVICE, CONTROL METHOD, AND NON-TRANSITORY COMPUTER-READABLE RECORDING MEDIUM

(71) Applicant: OMRON Corporation, Kyoto (JP)

(72) Inventors: Yuta Nagata, Kusatsu (JP); Kotaro Okamura, Kusatsu (JP); Jintaro Deki, Ritto (JP)

(73) Assignee: OMRON Corporation, Kyoto (JP)

( * ) Notice: Subject to any disclaimer, the term of this patent is extended or adjusted under 35 U.S.C. 154(b) by 1 day.

(21) Appl. No.: 16/127,254

(22) Filed: Sep. 11, 2018

(65) Prior Publication Data

US 2019/0163171 A1 May 30, 2019

(30) Foreign Application Priority Data

Nov. 27, 2017 (JP) ................. 2017-226973

(51) Int. Cl.
*G05B 15/02* (2006.01)
*G05B 19/418* (2006.01)
(Continued)

(52) U.S. Cl.
CPC ... *G05B 19/41835* (2013.01); *G05B 19/0426* (2013.01); *G05B 19/4183* (2013.01); *G06F 12/023* (2013.01); *G05B 2219/25221* (2013.01)

(58) Field of Classification Search
CPC .......... H04L 67/12; G05B 11/01; G05B 19/42
(Continued)

(56) References Cited

U.S. PATENT DOCUMENTS

| 5,113,502 A * | 5/1992 | Merrill ................. G05B 19/052 718/102 |
| 2004/0249606 A1* | 12/2004 | Hoppes ............ G05B 19/41805 702/183 |

(Continued)

FOREIGN PATENT DOCUMENTS

| EP | 1208427 | 5/2002 |
| EP | 3208676 | 8/2017 |
| JP | 2012018541 | 1/2012 |

OTHER PUBLICATIONS

"Search Report of Europe Counterpart Application", dated Mar. 21, 2019, p. 1-p. 8.

*Primary Examiner* — Titus Wong
(74) *Attorney, Agent, or Firm* — JCIPRNET

(57) ABSTRACT

The disclosure provides a control device including a memory storing address information and a server section communicating with the external machine serving as a destination of publishing the address information. The server section includes a determining section, a monitoring section, and an address managing section. The determining section determines priority levels of publishing variables included in a control program to the external machine in accordance with a predetermined rule. The monitoring section monitors free capacity of the memory. With respect to public variables for the external machine among the variables included in the control program, the address managing section adds logical addresses of the respective public variables to the address information in order of the publishing priority levels as long as the free capacity does not fall below a predetermined threshold.

8 Claims, 7 Drawing Sheets

(51) Int. Cl.
*G06F 12/02* (2006.01)
*G05B 19/042* (2006.01)

(58) Field of Classification Search
USPC ............................................. 711/170
See application file for complete search history.

(56) References Cited

U.S. PATENT DOCUMENTS

| | | | |
|---|---|---|---|
| 2005/0021156 A1* | 1/2005 | Kay | G05B 19/056 700/18 |
| 2006/0200261 A1* | 9/2006 | Monette | G05B 19/4183 700/108 |
| 2006/0212161 A1* | 9/2006 | Bhat | B29C 49/78 700/197 |
| 2007/0073750 A1* | 3/2007 | Chand | G05B 19/056 |
| 2009/0240636 A1* | 9/2009 | Hofmann | G05B 17/02 706/12 |
| 2010/0306313 A1* | 12/2010 | Mahnke | G06F 9/466 709/203 |
| 2013/0070788 A1* | 3/2013 | Deiretsbacher | H04L 29/10 370/466 |
| 2015/0277408 A1* | 10/2015 | Rolfsmeier | G05B 19/0426 700/86 |
| 2016/0274552 A1* | 9/2016 | Strohmenger | G05B 11/01 |

\* cited by examiner

CONTROL DEVICE, CONTROL METHOD, AND NON-TRANSITORY COMPUTER-READABLE RECORDING MEDIUM

CROSS-REFERENCE TO RELATED APPLICATION

This application claims the priority benefit of Japan application serial no. 2017-226973, filed on Nov. 27, 2017. The entirety of the above-mentioned patent application is hereby incorporated by reference herein and made a part of this specification.

BACKGROUND

Technical Field

The disclosure relates to a technique for publishing variables managed in an industrial control device to an external machine.

Description of Related Art

Factory automation (FA) systems that automate production processes are popular in various production sites. An FA system is composed of various industrial driving machines. The industrial driving machines include, for example, a moving table for moving a workpiece, or a conveyor for conveying a workpiece, or an arm robot for moving a workpiece to a predetermined destination, and so on. These driving machines are controlled by an industrial control device (hereinafter also "controller") such as a programmable logic controller (PLC) or a robot controller or the like.

In order to monitor a state of the industrial driving machine, it is necessary to access data in the controller. Regarding techniques for accessing the data in the controller, Japanese Laid-open No. 2012-018541 discloses a display device "capable of easily collecting data of an external machine regardless of type or connection of the external machine."

In recent years, controllers compatible with the Object Linking and Embedding for Process Control Unified Architecture (OPC-UA) are becoming popular. The OPC-UA is a communication standard defined for realizing data exchange without depending on the type of vendor, the type of operating system (OS), etc. By using a controller compatible with the OPC-UA, an external machine can easily access data (variables) managed in the controller.

SUMMARY

In order to publish the variables to the external machine, the controller needs to extract data necessary for accessing the variables (e.g., the variables, instances, etc.) in a memory. Since a portion of the storage area of the memory is used by the control program of the driving machine, the free capacity of the memory is limited. Therefore, when there are a large number of public variables, the controller may not be able to publish all the public variables.

According to an example of the disclosure, a control device for controlling a driving machine includes a memory, a determining section, a monitoring section, and an address managing section. The memory stores address information published to an external machine and defines logical addresses of variables comprised in a control program of the driving machine. The determining section determines publishing priority levels of the variables comprised in the control program to the external machine in accordance with a predetermined rule. The monitoring section monitors free capacity of the memory. With respect to one or more public variables that are permitted to be published to the external machine among the variables included in the control program, the address managing section adds a logical address of each of the one or more public variables to the address information in order of the publishing priority levels as long as the free capacity does not fall below a predetermined threshold.

According to an embodiment of the disclosure, the determining section sorts the variables included in the control program according to the predetermined rule, and sets a higher publishing priority level for a variable that is higher in a sorting order.

According to an embodiment of the disclosure, the predetermined rule includes sorting the variables included in the control program in order of character codes of variable names.

According to an embodiment of the disclosure, the predetermined rule includes sorting the variables included in the control program in order of priority levels predetermined for the respective variables.

According to an embodiment of the disclosure, each of the one or more public variables is associated with a namespace, and the predetermined rule includes sorting the variables included in the control program in order of priority levels predetermined for the namespaces.

According to an embodiment of the disclosure, the predetermined rule includes sorting the variables included in the control program so that a variable including a predetermined keyword is higher in the sorting order than other variables.

According to another example of the disclosure, a control method of a control device for controlling a driving machine includes: preparing address information in a memory, wherein the address information is published to an external machine and defines logical addresses of variables comprised in a control program of the driving machine; determining publishing priority levels of variables comprised in the control program to the external machine in accordance with a predetermined rule; monitoring free capacity of the memory; and with respect to one or more public variables that are permitted to be published to the external machine among the variables comprised in the control program, adding a logical address of each of the one or more public variables to the address information in order of the publishing priority levels as long as the free capacity does not fall below a predetermined threshold.

Another example of the disclosure provides a program executed by a control device of a driving machine. The program causes the control device to: prepare address information in a memory, wherein the address information is published to an external machine and defines logical addresses of variables comprised in a control program of the driving machine; determine publishing priority levels of variables comprised in the control program to the external machine in accordance with a predetermined rule; monitor free capacity of the memory; and with respect to one or more public variables that are permitted to be published to the external machine among the variables comprised in the control program, add a logical address of each of the one or more public variables to the address information in order of the publishing priority levels as long as the free capacity does not fall below a predetermined threshold.

DESCRIPTION OF THE EMBODIMENTS

Figure 1:
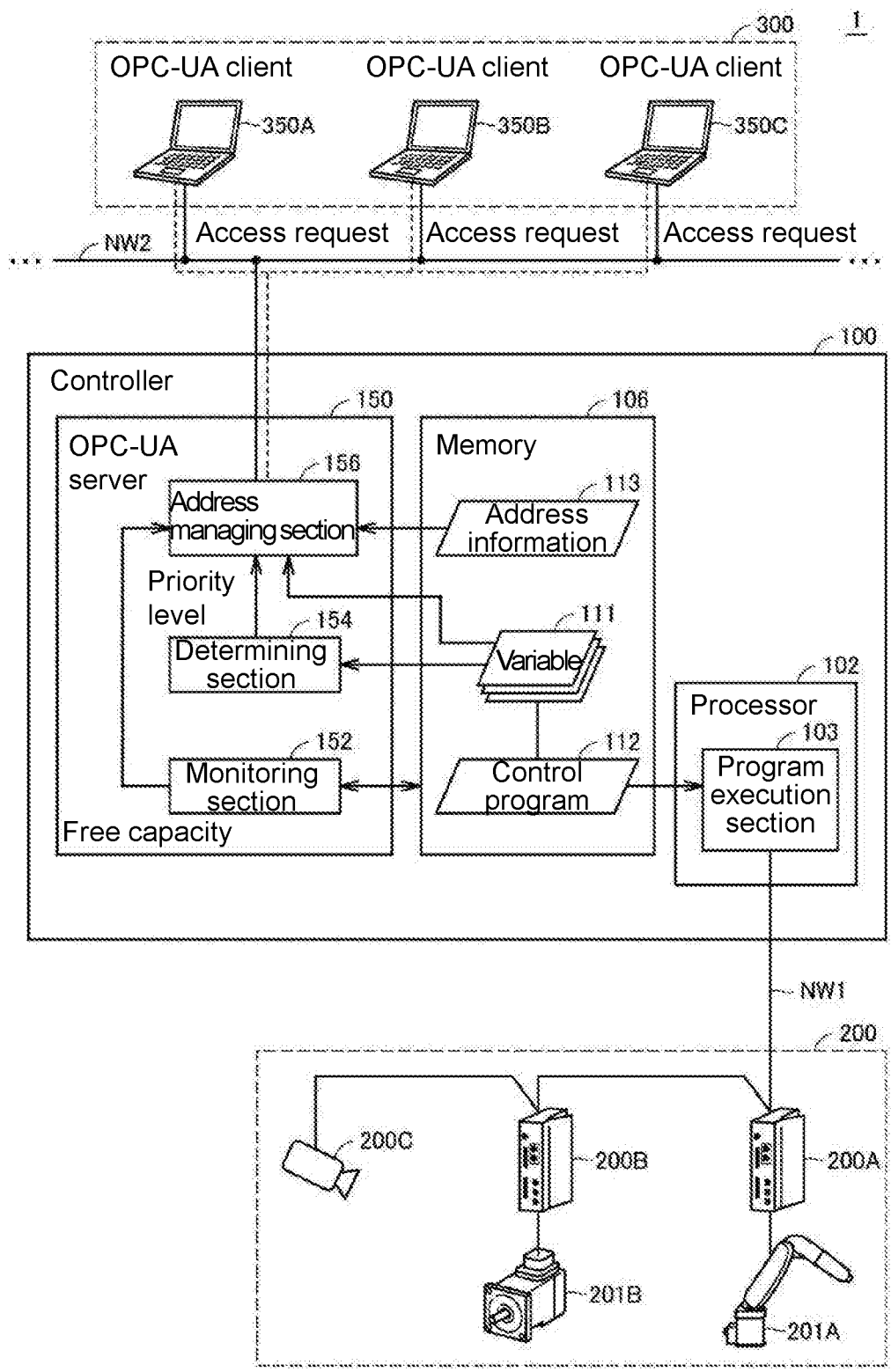
FIG. 1 illustrates a configuration example of an FA system according to an embodiment.

Embodiments according to the disclosure are hereinafter explained with reference to the drawings. In the following explanation, the same sections and components are denoted by the same reference numerals, and they also have the same names and functions. Accordingly, detailed explanation thereof will not be repeated.

The disclosure provides a technique capable of publishing as many variables with a higher public priority level as possible to the external machine.

According to the disclosure, since the control device adds the logical addresses of the public variables to the address information as long as the free capacity of the memory does not fall below the predetermined threshold, the control device can publish as many public variables as possible to the external machine. Also, since the logical addresses are added in order from the public variable with a higher publishing priority level, the control device can preferentially publish important public variables to the external machine.

According to the disclosure, the control device can determine the publishing priority levels of the variables in the sorting order of the variables.

According to the disclosure, the designer can set the publishing priority levels according to the naming rule of the variables, so it is possible to save time for setting the priority level for each of the variables.

According to the disclosure, the control device can preferentially publish a variable with a high publishing priority level set by the designer over other variables.

According to the disclosure, since the designer can designate the publishing priority levels with the namespaces, there is no need to set the publishing priority levels for all the variables.

According to the disclosure, since the designer can designate the publishing priority levels in the variable names, it is possible to save time and effort for setting the priority level for each of the variable names.

According to the disclosure, in the control method of the control device, the logical addresses of the public variables are added to the address information as long as the free capacity of the memory does not fall below the predetermined threshold, so the public variables can be published as many as possible to the external machine. Also, since logical addresses are added in order from the public variable with a higher publishing priority level, in the control method of the control device, important public variables can be preferentially exposed to the external machine.

According to the disclosure, the program executed by the control device adds the logical addresses of the public variables to the address information as long as the free capacity of the memory does not fall below the predetermined threshold, so the public variables can be published as possible to the external machine. Also, since the logical addresses are added in order from the public variable with a higher publishing priority level, the control program of the control device can preferentially publish important public variables to the external machine.

In one aspect, it is possible to publish as many variables with a higher publishing priority level as possible to the external machine.

A. APPLICATION EXAMPLE

Referring to FIG. 1, an application example of the disclosure is explained. FIG. 1 illustrates a configuration example of an FA system 1.

The FA system 1 is a system for automating a production process. In the example of FIG. 1, the FA system 1 is composed of a controller 100, a driving machine 200 and an external machine 300.

The controller 100 and the driving machine 200 are connected to a field network NW1. For the field network NW1, a network in which data arrival time is guaranteed and fixed-cycle communication is performed may be adopted. Known examples of such networks in which fixed-cycle communication is performed include EtherCAT (registered trademark), EtherNet/IP (registered trademark), DeviceNet (registered trademark), CompoNet (registered trademark) and so on.

The driving machine 200 includes various industrial machines for automating a production process. As an example, the driving machine 200 includes, a robot controller 200A controlling an arm robot 201A, or a servo driver 200B controlling a servomotor 201B, or a visual sensor 200C for photographing a workpiece, or other machine used in the production process, or the like.

The controller 100 and the external machine 300 are connected to a field network NW2. For the field network NW2, for example, a network in accordance with a communication standard capable of realizing data exchange without depending on the type of vendor or OS or the like may be adopted. Known examples of such a communication standard include Object Linking and Embedding for Process Control Unified Architecture (OPC-UA), and so on. In the following, explanation is given on the premise that the communication standard is OPC-UA. However, the communication standard adopted in the field network NW2 is not limited to OPC-UA.

In order to realize communication in accordance with OPC-UA, the controller 100 functions as a server, and the external machine 300 functions as a client. More specifically, an OPC-UA server 150 (server section) having a server function is installed on the controller 100. "OPC-UA server" mentioned herein is an application (program) functioning as a communication driver. In addition, the "server function" of the OPC-UA server refers to a function utilizing a memory region on a memory 106 of the controller 100, particularly, a function for communicating with the external machine 300 and realizing data exchange with the external machine 300.

In addition, OPC-UA clients 350A to 350C having a function of communicating with the OPC-UA server 150 are installed on the external machine 300. "OPC-UA client" mentioned herein is an application sending a communication request (access request) to the OPC-UA server 150. In the following, the OPC-UA clients 350A to 350C are also collectively referred to as OPC-UA clients 350.

By sending the access request to the OPC-UA server 150, the OPC-UA client 350 refers to address information 113 defining logical addresses of variables 111 included in a control program of the driving machine 200 and acquires the variables 111 managed in the controller 100 from the OPC-UA server 150. Details about the address information 113 will be described afterwards. Based on the acquired variables 111, the OPC-UA client 350 graphically displays a state of the controller 100 or the driving machine 200. The external machine 300 functioning as the OPC-UA client 350 includes, for example, a human machine interface (HMI), a personal computer (PC), a smartphone, a tablet terminal, or other information processing devices having a display function.

The controller 100 includes, in addition to the OPC-UA server 150, a processor 102 and the memory 106. The processor 102 includes a program execution section 103 as a functional configuration. The OPC-UA server 150 includes, as a functional configuration, a monitoring section 152, a determining section 154 and an address managing section 156.

Based on receipt of an order to execute the control program 112, the program execution section 103 extracts in the memory 106 various data required for executing the control program 112, and controls the driving machine 200 in accordance with the control program 112. In this way, the memory 106 functions as a working memory and temporarily stores therein the various data required for executing the control program 112.

Signals (typically input signals and output signals) exchanged between the controller 100 and the driving machine 200 are respectively treated as the variables 111 in the control program 112. That is, these realistic signals and the corresponding variables 111 in the control program 112 are essentially the same.

The monitoring section 152 monitors the free capacity of the memory 106 and outputs the usage to the address managing section 156. The determining section 154 determines the publishing priority levels of the variables 111 included in the control program 112 to the external machine 300 according to a predetermined rule. Details of the method of determining the publishing priority levels will be described later.

Regarding variables (hereinafter also referred to as "public variables") permitted to be published to the external machine 300 among the variables 111, as long as the free capacity of the memory 106 does not fall below a predetermined threshold, the address managing section 156 adds a logical address of each of the public variables to the address information 113 in accordance with the order of the publishing priority levels determined by the determining section 154. Details of the address information 113 will be described later. By adding the logical addresses of the public variables to the address information 113, the external machine 300 can access the public variables in the controller 100 and can refer to the values of the public variables.

Since a portion of the storage area of the memory 106 is used by the control program 112 for controlling the driving machine 200, the free capacity of the memory 106 is limited. Under such circumstance, if all the variables 111 are published to the external machine 300, it is possible that the memory 106 runs out of free capacity. In this case, it is possible that the control program 112 stops unintentionally and the FA system 1 stops. If the FA system 1 stops, there will be a great loss of opportunities. Therefore, it is favored that the FA system 1 be refrained from stopping as much as possible. Since the controller 100 according to the embodiment adds the logical addresses of the public variables to the address information 113 as long as the free capacity of the memory 106 does not fall below the predetermined threshold, the control program 112 does not stop due to the process of publishing the public variables.

On the other hand, the public variables may be published as many as possible, as long as the memory 106 has free space. Since the controller 100 according to the embodiment publishes the public variables as long as the free capacity of the memory 106 does not fall below the predetermined threshold, the public variables can be published as many as possible. Also, since the logical addresses are added in order from the public variable with a higher publishing priority level, the controller 100 can preferentially publish important public variables to the external machine 300.

Moreover, although the above has explained an example where the FA system 1 includes one controller 100 (OPC-UA server 150), the FA system 1 may include two or more controllers 100 (OPC-UA servers 150).

Moreover, although the above has explained an example where the FA system 1 includes three external machines 300 (OPC-UA clients 350), it suffices if the FA system 1 includes at least one external machine 300 (OPC-UA client 350).

Moreover, while the above has explained an example where the monitoring section 152 monitors the free capacity of the memory 106, since the free capacity of the memory 106 and the usage of the memory 106 are mutually related concepts, the monitoring section 152 may also be configured as monitoring the usage of the memory 106. In this case, the monitoring section 152 can calculate the free capacity of the memory 106 by subtracting the usage from the memory capacity of the memory 106.

In addition, although the above has explained the OPC-UA server 150 as an example of a server for realizing communication with the external machine 300, the OPC-UA server 150 may be replaced with any arbitrary type of server as long as the server is capable of realizing communication with the external machine 300. As an example, the OPC-UA server 150 may be replaced with a database (DB) server such as a Structured Query Language (SQL) server, a File Transfer Protocol (FTP) server, or a web server such as a Hypertext Transfer Protocol (HTTP) server.

In addition, even though FIG. 1 explains an example where the monitoring section 152, the determining section 154, and the address managing section 156 are implemented in the OPC-UA server 150, the monitoring section 152, the determining section 154, and the address managing section 156 may also be implemented outside the OPC-UA server 150. In this case, the monitoring section 152 individually monitors the usages of the memories 106 for the respective server sections. The determining section 154 determines the publishing priority levels of the public variables for the respective server sections. The address managing section 156 individually manages the address information 113 for the respective server sections.

B. SETTING PUBLIC VARIABLES

Figure 2:
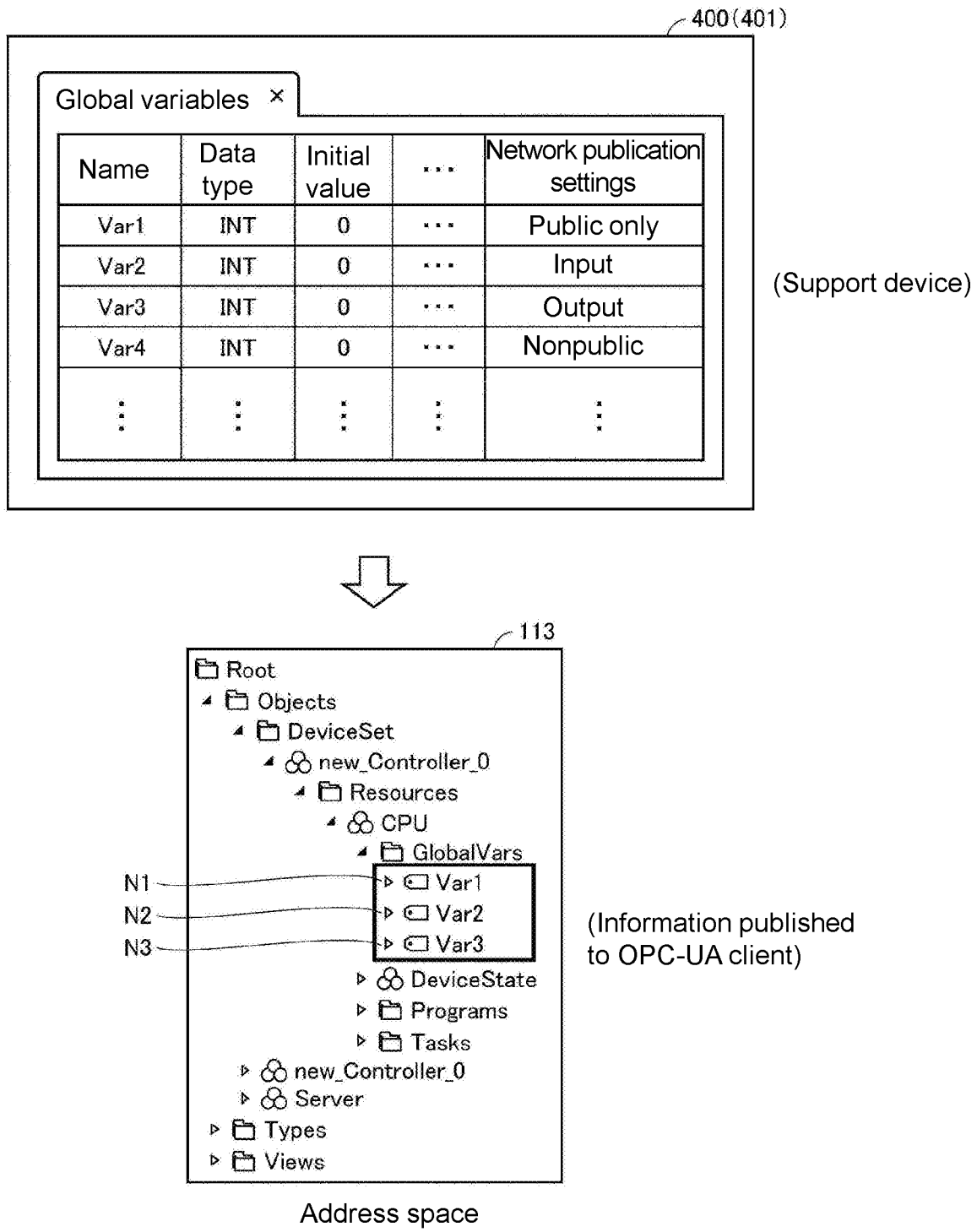
FIG. 2 illustrates a list of variables included in a control program and address information published to an external machine.

With reference to FIG. 2, a method of setting public variables will be described. FIG. 2 illustrates a list of variables included in the control program 112 and the address information 113 published to the external machine 300.

A designer of the control program 112 can perform setting of the public variables with respect to the OPC-UA clients 350 on a support device 400. The support device 400 is, for example, a PC, a tablet terminal, or other information processing devices having the display function. A development tool of the control program 112 may be installed on the support device 400. The designer designs the control program 112 on the development tool, and installs the designed control program 112 on the controller 100. The development tool of the control program 112 is, for example, "Sysmac Studio" made by OMRON Corporation.

FIG. 2 shows a setting screen 401 of the public variable. The designer can set, on the setting screen 401, attributes regarding each variable defined in the control program 112. The settable attributes include, for example, variable name, variable type, variable initial value, and publication attribute with respect to the OPC-UA clients 350. The publication attribute may be set to any of "public only," "input," "output," and "nonpublic." A variable set to "public only," "input" or "output" is public to the OPC-UA clients 350, and a variable set to "nonpublic" is not public to the OPC-UA clients 350.

In the example of FIG. 2, the OPC-UA clients 350 can access a variable "Var1" with a publication attribute set to "public only," a variable "Var2" with a publication attribute set to "input," and a variable "Var3" with a publication attribute set to "output". Meanwhile, the OPC-UA clients 350 cannot access a variable "Var4" with a publication attribute set to "nonpublic".

More specifically, regarding the variable "Var1" set to "public only," the OPC-UA clients 350 can only specify the variable name and cannot acquire the value of the variable. Regarding the variable "Var2" set to "input," the OPC-UA clients 350 can read but cannot rewrite the value of the variable. Regarding the variable "Var3" set to "output," the OPC-UA clients 350 can both read and rewrite the value of the variable.

C. ADDRESS INFORMATION 113

Figure 3:
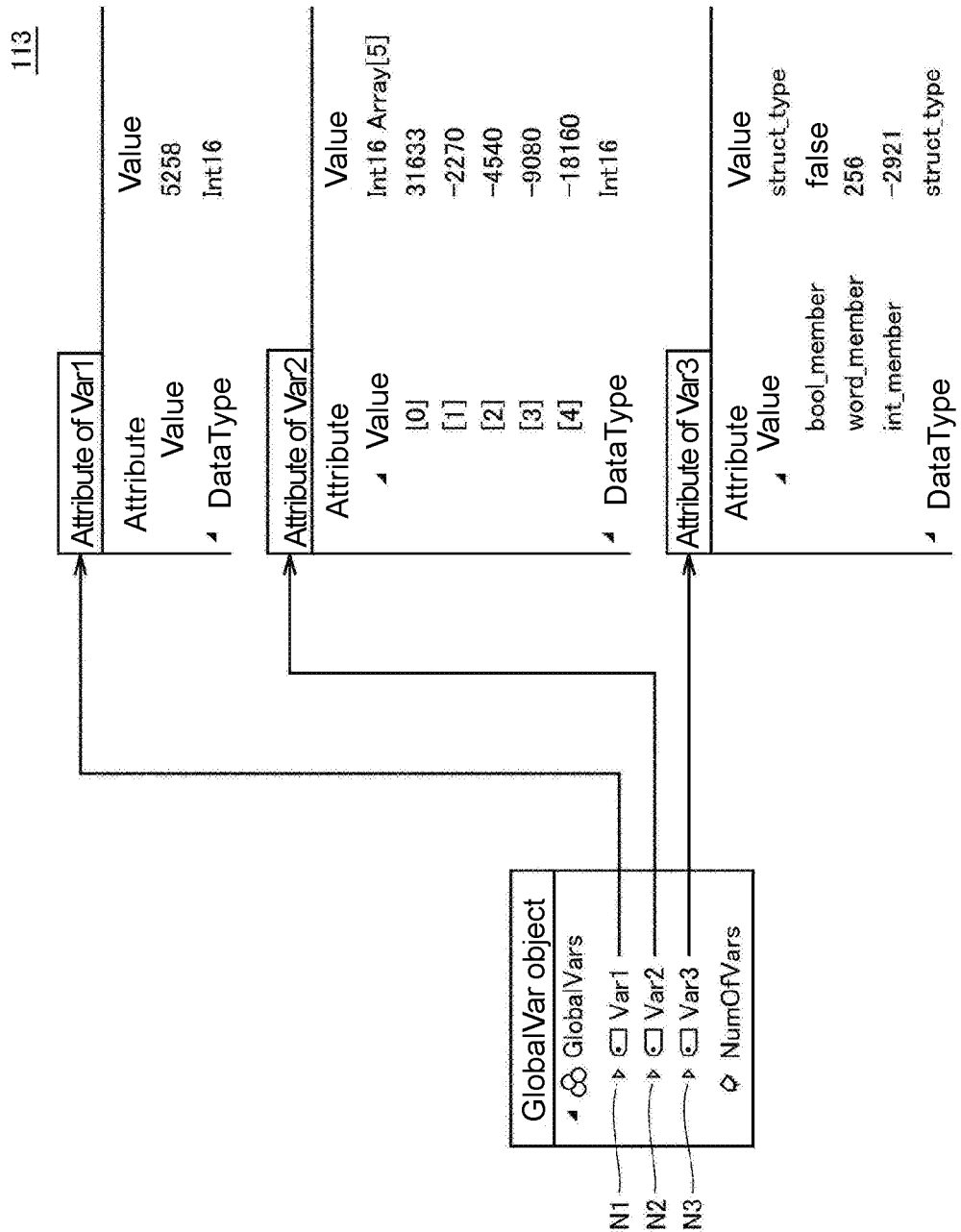
FIG. 3 is a diagram visually representing address information.

Then, the address information 113 will be described with reference to FIGS. 2 and 3. FIG. 3 is a diagram visually representing the address information 113.

As shown in FIG. 2, the address information 113 is generated according to the setting of the public variables in the setting screen 401. Typically, the address information 113 is generated by the controller 100, but the address information may also be generated by the support device 400. The generated address information 113 can serve as reference for the external machine 300 functioning as the OPC-UA client 350.

In the address information 113, the logical addresses of the variables 111 included in the control program 112 are defined. The logical addresses refer to logical positions on the memory 106 and represent relative positions with respect to predetermined information (e.g., "ROOT" in FIG. 2) on the memory 106 as reference. More specifically, the address information 113 is composed of a plurality of nodes. Each of the nodes defines an attribute of a corresponding variable (e.g. address, variable value, type of variable etc.). Each of the nodes is associated with another node and has a hierarchical relationship. The OPC-UA client 350 can look for a target node by tracing the logical addresses of the respective nodes defined in the address information 113, and acquires the type of the variable or the value of the variable defined in the node by referring to the attribute of the target node found by the OPC-UA client 350.

In FIG. 2 and FIG. 3, variables in a controller "new_Controller_0" are managed as nodes N1 to N3. By sequentially tracing the node "new_Controller_0" included in an object "DeviceSet" and a node "CPU" included in an object "Resources", the OPC-UA client 350 can access the nodes N1 to N3 included in an object "GlobalVars".

In the example of FIG. 3, the values of the variables and the types of the variables are defined as attributes of the variables in the nodes N1 to N3. By referring to the node N1, the OPC-UA client 350 can specify the type and the value of the variable "Var1" associated with the node N1. In addition, by referring to the node N2, the OPC-UA client 350 can specify the type and the value of the variable "Var2" associated with the node N2. In addition, by referring to the node N3, the OPC-UA client 350 can specify the type and the value of the variable "Var3" associated with the node N3.

D. OVERALL FLOW

Figure 4:
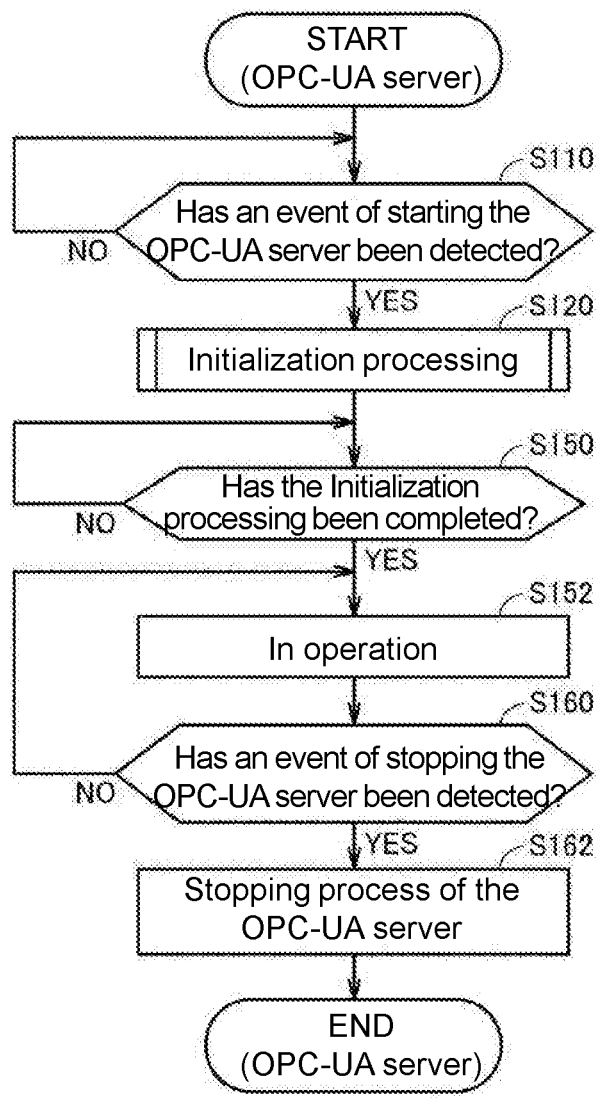
FIG. 4 is a flowchart showing processing from startup to shutdown of an OPC-UA server.

With reference to FIG. 4, the control structure of the OPC-UA server 150 in the controller 100 will be described. FIG. 4 is a flowchart showing processing from startup to shutdown of the OPC-UA server 150. The processing shown in FIG. 4 is realized through executing a program by the processor 102 (see FIG. 1) of the controller 100. In other aspects, part or all of the processing may be performed by circuit elements or other hardware.

In Step S110, the processor 102 determines whether an event for starting the OPC-UA server 150 has been detected. If the processor 102 determines that the event for starting the OPC-UA server 150 has been detected (YES in Step S110), the processor 102 switches the control to Step S120. Otherwise (NO in Step S110), the processor 102 executes the process of Step S110 again.

In Step S120, the processor 102 starts the OPC-UA server 150 and executes an initialization processing of the OPC-UA server 150. Details of the initialization processing of the OPC-UA server 150 will be described later.

In Step S150, the processor 102 determines whether the initialization processing of the OPC-UA server 150 has been completed. If the processor 102 determines that the initialization processing of the OPC-UA server 150 has been completed (YES in Step S150), the processor 102 switches the control to Step S152. Otherwise (NO in Step S150), the processor 102 executes the process of Step S150 again.

In Step S152, the processor 102 sets the state of the OPC-UA server 150 as in operation. As a result, the OPC-UA server 150 is in a state able to receive the access request to the public variables from the OPC-UA clients 350. The access request is, for example, a Read request, a Write request, or a Subscription request. If the access request is a read request, the OPC-UA server 150 sends the value of the public variable to be accessed to the OPC-UA client 350 once. If the access request is a write request, the OPC-UA server 150 rewrites the public variable to be accessed to a specified value. If the access request is a Subscription request, the OPC-UA server 150 periodically sends the value of the public variable to be accessed.

In Step S160, the processor 102 determines whether an event for stopping the OPC-UA server 150 has been detected. If the processor 102 determines that the event for stopping the OPC-UA server 150 has been detected (YES in Step S160), the processor 102 switches the control to Step S162. Otherwise (NO in Step S160), the processor 102 returns the control to Step S152.

In Step S162, the processor 102 executes a stopping process of the OPC-UA server 150. At this time, the processor 102 does not stop the control of the driving machine 200 by the control program 112. As a result, the processor 102 can stop only the server function of the OPC-UA server 150 without hindering the driving of the driving machine 200.

The processor 102 may release the storage area on the memory 106 used by the OPC-UA server 150 and then stops the server function. In this way, the OPC-UA server 150 can reduce the usage of the memory 106 to reliably prevent the execution of the control program 112 of the driving machine 200 from being stopped.

E. INITIALIZATION FLOW

Figure 5:
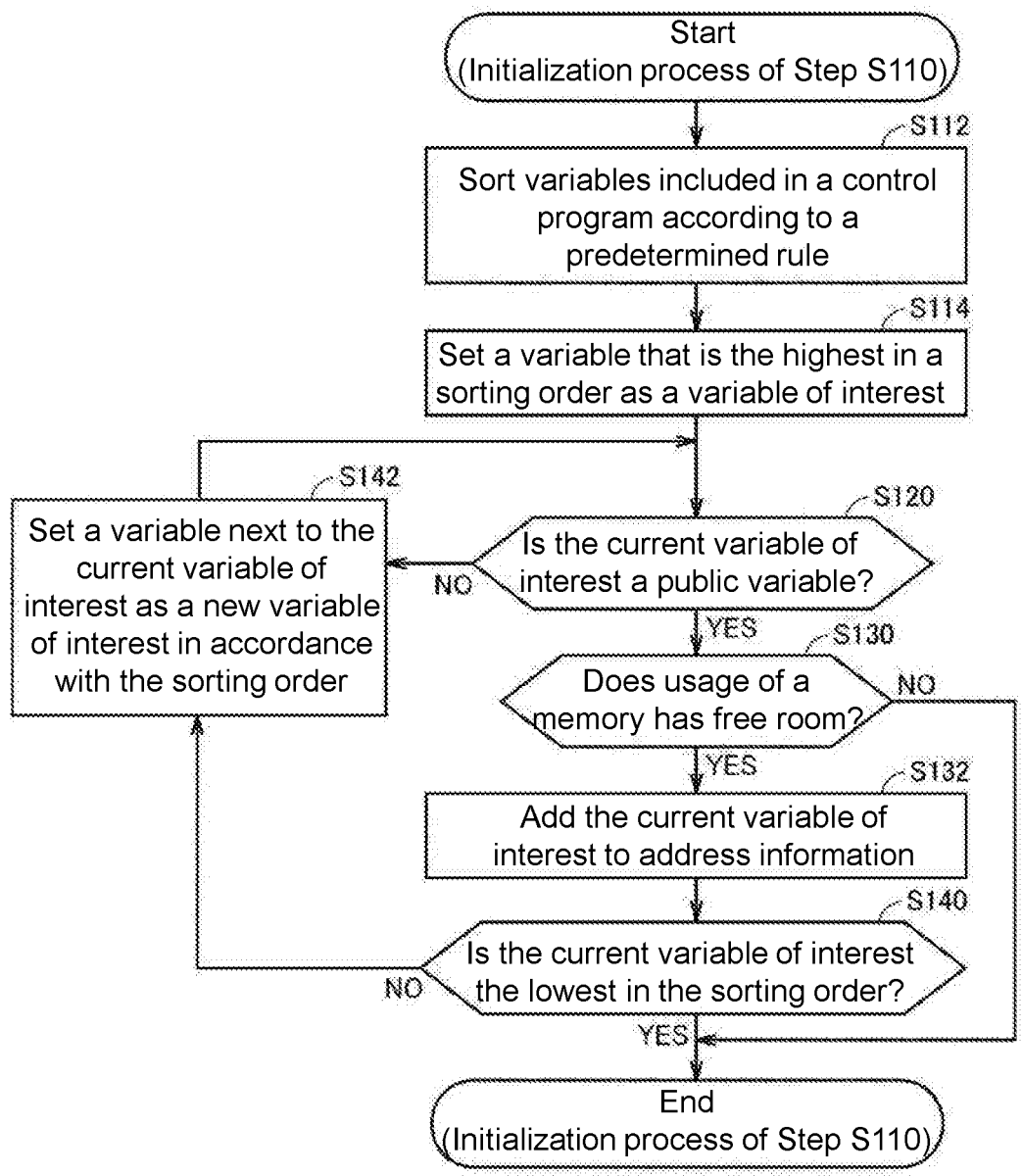
FIG. 5 is a flowchart showing an initialization processing of an OPC-UA server.

With reference to FIG. 5, the initialization processing in Step S120 shown in FIG. 4 will be described. FIG. 5 is a flowchart showing the initialization processing of the OPC-UA server 150.

In Step S112, the processor 102, which serves as the determining section 154 (see FIG. 1), sorts the variables 111 included in the control program 112 according to a predetermined sorting rule. The processor 102 determines the publishing priority levels of the respective variables according to the sorting order. A specific example of the variable sorting rule will be described later. The processor 102 sets a higher publishing priority level for a variable that is higher in the sorting order.

In Step S114, the processor 102 sets the variable that is the highest in the sorting order in Step S112 as a variable of interest.

In Step S120, the processor 102 determines whether the current variable of interest is a public variable. Each of the variables is set in advance to be public or nonpublic. The method of setting the public variables is the same as explained in FIG. 2, so the descriptions thereof will not be repeated. If the processor 102 determines that the current variable of interest is a public variable (YES in Step S120), the processor 102 switches the control to Step S130. Otherwise (NO in Step S120), the processor 102 switches the control to Step S142.

In Step S130, the processor 102, which serves as the monitoring section 152 (see FIG. 1), determines whether the usage of the memory 106 has free room. As an example, if the usage of the memory 106 is equal to or greater than a predetermined threshold, the processor 102 determines that the usage of the memory 106 has free room. If the processor 102 determines that the usage of the memory 106 has free room (YES in Step S130), the processor 102 switches the control to Step S132. Otherwise (NO in Step S130), the processor 102 ends the initialization processing of the OPC-UA server 150 shown in FIG. 5.

In Step S132, the processor 102, which serves as the address managing section 156 (see FIG. 1), adds the current variable of interest to the address information 113 (see FIGS. 2 and 3). Information related to the variable of interest is added to the address information 113 as a node. The node includes information such as the logical address of the variable of interest, the type of the variable of interest, a reference destination (e.g., logical addresses of nodes) from the node to another node, etc.

In Step S140, the processor 102 determines whether or not the current variable of interest is the lowest (last) in the sorting order. When the processor 102 determines that the variable of interest is the lowest in the sorting order (YES in Step S140), the processor 102 terminates the initialization processing of the OPC-UA server 150 shown in FIG. 5. Otherwise (NO in Step S140), the processor 102 switches the control to Step S142.

In Step S142, the processor 102 sets the variable next to the current variable of interest in the sorting order as a new variable of interest according to the sorting order in Step S112.

As described above, the processor 102 sorts the variables 111 included in the control program 112 according to the predetermined sorting rule. Thereafter, the processor 102 adds the variables 111 to the address information 113 in order from the public variable that is higher in the sorting order. At this time, the processor 102 performs the process of adding the public variables to the address information 113 as long as the memory 106 has free room.

The processor 102 may record a public variable that cannot be published due to the usage of the memory 106 reaching the upper limit in a log. At this time, the processor 102 records the fact that the usage of the memory 106 has reached the upper limit in the log as the reason why the public variable cannot be published. The log is stored in an external storage device such as a memory card 140 (see FIG. 7), for example.

In the above description, an example where the processor 102 sorts the variables 111 included in the control program 112 according to the predetermined rule and decides the publishing priority level of each of the variables 111 according to the sorting order has been described. However, in deciding the priority level of each of the variables 111, the processor 102 does not necessarily need to sort the variables 111.

F. HOW TO DECIDE PUBLISHING PRIORITY LEVEL

As mentioned above, the controller 100 sorts the variables 111 included in the control program 112 in accordance with the predetermined sorting rule and adds the variables to the address information 113 in order from the variable that is higher in the sorting order. Various algorithms can be adopted for the sorting rule. Below, specific examples 1 to 4 of the sorting rule will be described as examples.

F1. Specific Example 1 of the Sorting Rule

In the sorting rule of this specific example, the controller 100 sorts each of the variables 111 included in the control program 112 according to character codes of the variable names.

More specifically, the controller 100 sorts each of the variables 111 included in the control program 112 in an ascending/descending order according to the character codes of the variable names. When sorting in the ascending order, the controller 100 focuses on the first characters of the variables, and sorts each of the variables in the order of "0"→"9" for numbers and in the order of "A"→"Z" for English letters. Next, for each group of variables with the same first character, the controller 100 sorts the variables in the ascending order according to the character codes of the second characters. The controller 100 sorts the variables 111 in the ascending order by repeating such a sorting process.

When sorting in the descending order, the controller 100 focuses on the first characters of the variables, sorts each of the variables in the order of "9"→"0" for numbers and in the order of "Z"→"A" for English letters. Next, for each group of variables with the same first character, the controller 100 sorts the variables in the descending order according to the character codes of the second characters. The controller 100 sorts the variables 111 in the descending order by repeating such a sorting process.

The designer can set the publishing priority levels according to the naming rule of the variables, so it is possible to save time for setting the priority level for each of the variables.

F2. Specific Example 2 of the Sorting Rule

In the sorting rule of this specific example, the OPC-UA server 150 sorts the variables 111 included in the control program 112 in order of priority levels predetermined for the respective variables.

The setting of the priority level for each of the variables is performed on the setting screen 401 of the support device 400 shown in FIG. 2, for example. More specifically, in the setting screen 401, the designer sets whether each of the variables 111 is permitted to be published to the external machine 300, and sets the publishing priority level for each of the variables as an attribute of the variable.

In one aspect, in the setting screen 401, a text input field (e.g., text box) is displayed side by side with each of the variables, and the designer specifies the publishing priority level as a numerical value (e.g., five stages from 1 to 5) in each of the text input fields.

In another aspect, in the setting screen 401, a pull-down menu is displayed side by side with each of the variables, and the designer sets the publishing priority level by selecting one selection item from selection items included in each of the pull-down menus. As an example, the selection items include a high priority item, an intermediate priority item, and a low priority item. The variable set with the high priority item is published more preferentially than other variables. The variable set with the intermediate priority item is preferentially published after the variable set with the high priority item. The variable set with the low priority item is preferentially published after the variable set with the intermediate priority item.

The controller 100 sorts the variables 111 included in the control program 112 in order of the priority levels that are set. As a result, the OPC-UA server 150 can preferentially publish a variable with a high publishing priority level set by the designer over other variables.

F3. Specific Example 3 of the Sorting Rule

In the sorting rule of this specific example, the OPC-UA server 150 sorts the variables 111 included in the control program 112 in order of priority levels predetermined for namespaces to which the respective variables belong.

More specifically, each of the variables 111 may belong to a namespace defined by the designer in the control program 112. The controller 100 can distinguish variables with the same variable name according to the namespaces to which the variables belong.

The setting of the priority levels for the namespaces is performed on the setting screen 401 of the support device 400 shown in FIG. 2, for example. As an example, a list of defined namespaces is displayed on the setting screen 401, and the designer sets the publishing priority level for each of the namespaces.

In one aspect, in the setting screen 401, a text input field (e.g., text box) is displayed side by side with each of the variables, and the designer specifies the publishing priority level as a numerical value (e.g., five stages from 1 to 5) in each of the text input fields.

In another aspect, in the setting screen 401, a pull-down menu is displayed side by side with each of the variables, and the designer sets the publishing priority level by selecting one selection item from the selection items included in each of the pull-down menus. As an example, the selection items include a high priority item, an intermediate priority item, and a low priority item. A variable belonging to a namespace set with the high priority item is more preferentially published than other variables. A variable belonging to a namespace set with the intermediate priority item is preferentially published after the variable belonging to the namespace set with the high priority item. A variable belonging to a namespace set with the low priority item is preferentially published after the variable belonging to the namespace set with the intermediate priority item.

The controller 100 sorts the variables 111 included in the control program 112 in order of the priority levels set in the namespaces. As a result, the OPC-UA server 150 can preferentially publish a variable belonging to a namespace with a high publishing priority level over variables belonging to other namespaces. In addition, since the designer can designate the publishing priority levels with the namespaces, there is no need to set the publishing priority levels for all the variables.

F4. Specific Example 4 of the Sorting Rule

In the sorting rule of this specific example, the OPC-UA server 150 sorts the variables 111 included in the control program 112 so that a variable including a predetermined keyword is set higher in the sorting order than other variables.

As an example, the OPC-UA server 150 sets a variable including the keyword "Public_" to be higher in the sorting order than other variables. The designer can raise the publishing priority level of a variable whose publishing priority level is to be raised by attaching the keyword "Public_" to the variable.

If there are plural types of keywords, the designer may also set a priority level for each of the keywords. For example, it is assumed that a keyword "Public1_" and a keyword "Public2_" are defined. In this case, the designer sets a priority level for each of the keywords "Public1_" and "Public2_". If the priority level of the keyword "Public1_" is set to be higher than the priority level of the keyword "Public2_", the OPC-UA server 150 sets a variable including the keyword "Public1_" to be higher in the sorting order than a variable including the keyword "Public 2_". In addition, the OPC-UA server 150 sets the variable including the keyword "Public2_" to be higher in the sorting order than the remaining variables.

As a result, since the designer can designate the publishing priority levels with the variable names, it is possible to save time and effort for setting the priority level for each of the variable names.

F5. Other Sorting Rules

The sorting rule of the variables 111 is not limited to the above "Specific Example 1" to "Specific Example 4", and various other sorting rules may be adopted. For example, an algorithm (e.g., algorithm for solving the Knapsack Problem) for sorting the variables 111 may be adopted for the sorting rule of the variables 111 so that more variables are efficiently published.

Also, the sorting rule of the variables 111 does not need to be fixed, and may be changed dynamically. As an example, the sorting rule that is applied may be dynamically set by the user or be automatically set. In this case, when the public variables are being set, applicable sorting rule candidates are displayed in a list, and the user selects a sorting rule to be applied from the sorting rules displayed in the list. The OPC-UA server 150 sorts the variables 111 included in the control program 112 according to the selected sorting rule.

G. FUNCTIONAL CONFIGURATION OF CONTROLLER 100

Figure 6:
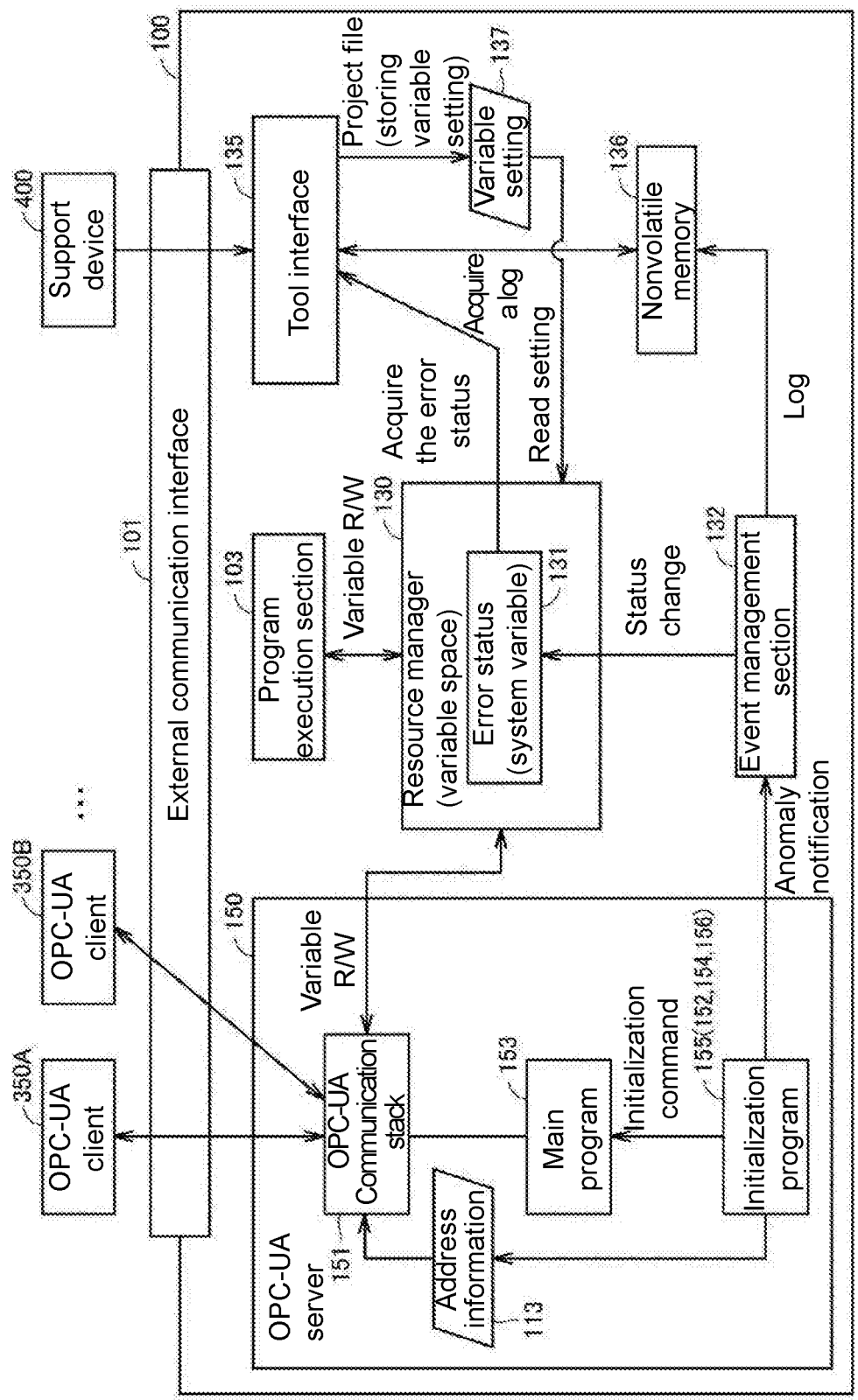
FIG. 6 illustrates an example of a functional configuration of a controller according to an embodiment.

The function of the controller 100 will be described with reference to FIG. 6. FIG. 6 illustrates an example of a functional configuration of the controller 100.

The controller 100 includes an external communication interface 101, a program execution section 103, a resource manager 130, an event managing section 132, a tool interface 135, a nonvolatile memory 136, and the OPC-UA server 150. The OPC-UA server 150 includes a communication stack 151, a main program 153, and an initialization program 155.

The external communication interface 101 communicates with the OPC-UA clients 350A and 350B being the external machine 300. For the external communication interface 101, for example, EtherNet (registered trademark) is adopted. In addition, the external communication interface 101 communicates with the support device 400. "Sysmac Studio" being a development tool of the control program 112, is installed on the support device 400. The tool interface 35 receives the control program 112 designed on the development tool via the external communication interface 101. In addition, the tool interface 135 receives a setting (e.g., variable setting, etc.) related to a project file on the development tool via the external communication interface 101, and writes the setting in a variable setting 137. Moreover, the tool interface 135 sends error information and log data of the controller 100 to the support device 400 via the external communication interface 101.

The resource manager 130 retains the entity of each of the variables in the controller 100 and is responsible for managing each of the variables, or reading/writing each of the variables, and so on. As an example, when receiving an order to read (acquire) a variable, the resource manager 130 accesses the variable to be read and sends the variable to a source issuing the read order. In addition, when receiving an order to write a variable, the resource manager 130 accesses the variable to be written and rewrites the variable to a designated value. The variables managed by the resource manager 130 include the variables in the control program 112, a system variable 131 indicating the state of the controller 100, etc.

The event managing section 132 executes processing corresponding to an event that occurs in the controller 100. In one aspect, the event managing section 132 outputs a warning when detecting an event indicating that the usage of the memory 106 is about to reach the upper limit. The event is issued based on the fact that the usage of the memory 106 has exceeded the predetermined threshold. The warning is output in an arbitrary mode. As an example, the warning is output by writing the content of the warning as a log to the non-volatile memory 136. Alternatively, the warning is output by writing the content of the warning as a log to an external storage device such as the memory card 140 (see FIG. 7).

The OPC-UA communication stack 151 temporarily holds data sent to the OPC-UA clients 350 and data received from the OPC-UA clients 350. The main program 153 is software for realizing the server function by the OPC-UA server 150. The initialization program 155 is software for realizing the initialization processing of the OPC-UA server 150 shown in FIG. 5. The initialization program 155 is software for realizing the function of monitoring the free capacity of the memory 106 by the monitoring section 152, the function of determining the publishing priority levels for the variables by the determining section 154, and the function of managing the address information 113 by the address managing section 156. The initialization program 155 may be configured integrally with the main program 153, or may be configured separately from the main program 153 as shown in FIG. 6.

H. HARDWARE CONFIGURATION OF CONTROLLER 100

Figure 7:
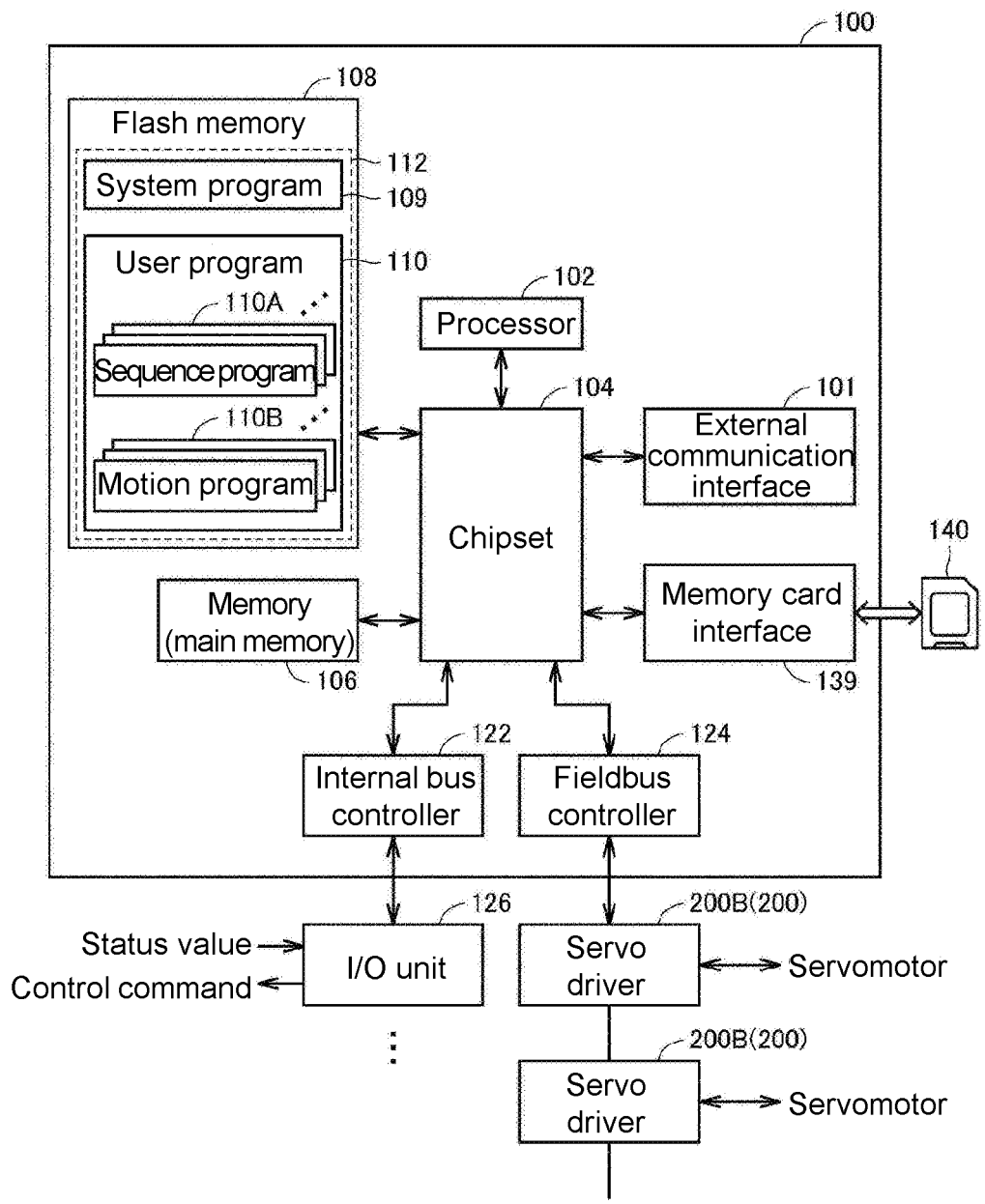
FIG. 7 is a schematic diagram showing an example of a hardware configuration of a controller according to an embodiment.

Referring to FIG. 7, a hardware configuration of the controller 100 is explained. FIG. 7 is a schematic diagram illustrating an example of the hardware configuration of the controller 100.

The controller 100 includes the external communication interface 101, the processor 102 such as a central processing unit (CPU) or a microprocessing unit (MPU) or the like, a chipset 104, the memory 106 as a main memory, a flash memory 108, an internal bus controller 122, a fieldbus controller 124 and the memory card interface 139.

The processor 102 reads the control program 112 stored in the flash memory 108 and extracts and executes the control program 112 in the memory 106, thereby realizing arbitrary control over the servo driver 200B or the like being an example of the driving machine 200. The control program 112 includes various programs for controlling the controller 100. As an example, the control program 112 includes a system program 109 and a user program 110 and so on. The system program 109 includes order codes for providing basic functions of the controller 100, such as data input/output processing or control of execution timing and so on. The user program 110 is arbitrarily designed according to a control object, and includes a sequence program 110A for executing sequence control and a motion program 110B for executing motion control. The control program 112 is, for example, a PLC program written in ladder language or structured text (ST) language.

The chipset 104 realizes processing as the entire controller 100 by controlling each component.

The internal bus controller 122 is an interface for the controller 100 to exchange data with various devices connected to the controller 100 through an internal bus. As an example of such devices, an input/output (I/O) unit 126 is connected to the controller 100.

The fieldbus controller 124 is an interface for the controller 100 to exchange data with various devices connected to the controller 100 through a fieldbus. As an example of such devices, the servo driver 200B is connected to the controller 100. In addition, the robot controller 200A (see FIG. 1) or the visual sensor 200C (see FIG. 1) or the like may also be connected to the controller 100.

The internal bus controller 122 and the fieldbus controller 124 are capable of giving an arbitrary command to a connected device, and capable of acquiring arbitrary data (including measured values) managed by the device. In addition, the internal bus controller 122 and/or the fieldbus controller 124 also functions as an interface for exchanging data with the servo driver 200B.

The external communication interface 101 controls data exchange through various wired/wireless networks. The memory card interface 139 is configured to allow the memory card 140 (e.g., a Secure Digital (SD) card) being an example of the external memory medium to be installed thereon and removed therefrom, so that data can be written to and read from the memory card 140.

I. SUMMARY

As described above, the controller 100 includes the OPC-UA server 150 for realizing communication with the external machine 300 functioning as the OPC-UA client 350. The OPC-UA server 150 sorts the variables 111 included in the control program 112 according to the predetermined sorting rule. Then, the OPC-UA server 150 adds the variables (i.e., public variables) permitted to be published to the external machine 300 to the address information 113 in order from the variable that is higher in the sorting order. At this time, the OPC-UA server 150 performs a process of adding the public variables to the address information 113 as long as the memory 106 has free room.

In an industrial control device such as the controller 100, under the situation where the usable capacity of the memory 106 is limited, if all the variables 111 are published to the external machine 300, the memory 106 may run out of free capacity. In this case, the control program 112 may unintentionally stop. Since the OPC-UA server 150 publishes the public variables as long as the free capacity of the memory 106 does not fall below the predetermined threshold, the control program 112 does not stops due to the process of publishing the public variables.

On the other hand, since the OPC-UA server 150 adds the logical addresses of the public variables to the address information 113 as long as the free capacity of the memory 106 does not fall below the predetermined threshold, the public variables can be published as many as possible. Also, since the logical addresses are added in order from the public variable with a higher publishing priority level, the controller 100 can preferentially publish important public variables to the external machine 300.

J. APPENDIX

As stated above, the present embodiment includes the following disclosures.

[Configuration 1]
A control device (100) for controlling a driving machine (200), including:
a memory (106) which stores address information (113) published to an external machine (300) and defines logical addresses of variables included in a control program (112) of the driving machine (200);
a determining section (154) which determines publishing priority levels of the variables included in the control program (112) to the external machine (300) in accordance with a predetermined rule;
a monitoring section (152) which monitors free capacity of the memory (106); and
an address managing section (156) which, with respect to one or more public variables that are permitted to be published to the external machine (300) among the variables included in the control program (112), adds a logical address of each of the one or more public variables to the address information (113) in order of the publishing priority levels as long as the free capacity does not fall below a predetermined threshold.

[Configuration 2]
The control device according to Configuration 1, wherein the determining section (154) sorts the variables included in the control program (112) according to the predetermined rule, and sets a higher publishing priority level for a variable that is higher in a sorting order.

[Configuration 3]
The control device according to Configuration 2, wherein the predetermined rule includes sorting the variables included in the control program (112) in order of character codes of variable names.

[Configuration 4]
The control device according to Configuration 2, wherein the predetermined rule includes sorting the variables included in the control program (112) in order of priority levels predetermined for the respective variables.

[Configuration 5]
The control device according to Configuration 2, wherein each of the one or more public variables is associated with a namespace, and the predetermined rule includes sorting the variables included in the control program (112) in order of priority levels predetermined for the namespaces.

[Configuration 6]
The control device according to Configuration 2, wherein the predetermined rule includes sorting the variables included in the control program (112) so that a variable including a predetermined keyword is higher in the sorting order than other variables.

[Configuration 7]
A control method of a control device (100) for controlling a driving machine (200), the control method including:
preparing address information (113) in a memory (106), wherein the address information (113) is published to an external machine (300) and defines logical addresses of variables included in a control program (112) of the driving machine (200);
determining publishing priority levels of variables included in the control program (112) to the external machine (300) in accordance with a predetermined rule;
monitoring free capacity of the memory (106); and
with respect to one or more public variables that are permitted to be published to the external machine (300) among the variables included in the control program (112), adding a logical address of each of the one or more public variables to the address information (113) in order of the publishing priority levels as long as the free capacity does not fall below a predetermined threshold.

[Configuration 8]
A control program for controlling a control device (100) of a driving machine (200), wherein the control program (112) causes the control device (100) to:
prepare address information (113) in a memory (106), wherein the address information (113) is published to an external machine (300) and defines logical addresses of variables included in a control program (112) of the driving machine (200);
determine publishing priority levels of variables included in the control program (112) to the external machine (300) in accordance with a predetermined rule;
monitor free capacity of the memory (106); and
with respect to one or more public variables that are permitted to be published to the external machine (300) among the variables included in the control program (112), add a logical address of each of the one or more public variables to the address information (113) in order of the publishing priority levels as long as the free capacity does not fall below a predetermined threshold.

The embodiments disclosed herein are examples in all aspects and should not be interpreted as limitations. The scope of the disclosure is defined by claims instead of the above explanation, and it is intended to include all modifications within the scope of the claims and the equivalents thereof.

What is claimed is:

1. A control device for controlling a driving machine, comprising:
    a memory which stores address information published to an external machine and defines logical addresses of variables comprised in a control program of the driving machine;
    a processor which refers to the logical addresses in the address information to acquire the variables comprised in the control program after receiving an access request from the external machine;
    a determining section which determines publishing priority levels of the variables comprised in the control program to the external machine in accordance with a predetermined rule;
    a monitoring section which monitors free capacity of the memory; and
    an address managing section which, with respect to one or more public variables that are permitted to be published to the external machine among the variables comprised in the control program, adds a logical address of each of the one or more public variables to the address information in order of the publishing priority levels as long as the free capacity does not fall below a predetermined threshold.

2. The control device according to claim 1, wherein the determining section sorts the variables comprised in the control program according to the predetermined rule, and sets a higher publishing priority level for a variable that is higher in a sorting order.

3. The control device according to claim 2, wherein the predetermined rule comprises sorting the variables comprised in the control program in order of character codes of variable names.

4. The control device according to claim 2, wherein the predetermined rule comprises sorting the variables comprised in the control program in order of priority levels predetermined for the respective variables.

5. The control device according to claim 2, wherein each of the one or more public variables is associated with a namespace, and the predetermined rule comprises sorting the variables comprised in the control program in order of priority levels predetermined for the namespaces.

6. The control device according to claim 2, wherein the predetermined rule comprises sorting the variables comprised in the control program so that a variable comprising a predetermined keyword is higher in the sorting order than other variables.

7. A control method of a control device for controlling a driving machine, the control method comprising:
    preparing address information in a memory, wherein the address information is published to an external machine and defines logical addresses of variables comprised in a control program of the driving machine;
    determining publishing priority levels of variables comprised in the control program to the external machine in accordance with a predetermined rule;
    monitoring free capacity of the memory;
    with respect to one or more public variables that are permitted to be published to the external machine among the variables comprised in the control program, adding a logical address of each of the one or more public variables to the address information in order of the publishing priority levels as long as the free capacity does not fall below a predetermined threshold; and
    after receiving an access request from the external machine, referring to the logical addresses in the address information to acquire the variables comprised in the control program.

8. A non-transitory computer-readable recording medium storing a program executed by a control device of a driving machine, wherein the program causes the control device to:
    prepare address information in a memory, wherein the address information is published to an external machine and defines logical addresses of variables comprised in a control program of the driving machine;
    determine publishing priority levels of variables comprised in the control program to the external machine in accordance with a predetermined rule;
    monitor free capacity of the memory;
    with respect to one or more public variables that are permitted to be published to the external machine among the variables comprised in the control program, add a logical address of each of the one or more public variables to the address information in order of the publishing priority levels as long as the free capacity does not fall below a predetermined threshold; and
    after receiving an access request from the external machine, referring to the logical addresses in the address information to acquire the variables comprised in the control program.

* * * * *